United States Patent [19]

Kloppe et al.

[11] Patent Number: 4,559,274

[45] Date of Patent: Dec. 17, 1985

[54] COMPOSITE COMPONENTS OF SANDWICH CONSTRUCTION

[75] Inventors: Herbert Kloppe, Pulheim; Erwin Spiegel, Bergheim; Hans Vogt, Overath, all of Fed. Rep. of Germany

[73] Assignee: Ford Motor Company, Dearborn, Mich.

[21] Appl. No.: 485,986

[22] Filed: Apr. 18, 1983

[30] Foreign Application Priority Data

Apr. 27, 1982 [DE] Fed. Rep. of Germany ....... 3215616

[51] Int. Cl.[4] .................... B32B 5/20; B29C 67/22
[52] U.S. Cl. .................................. 428/594; 428/626;
52/309.9; 264/45.3; 264/46.6; 264/46.7
[58] Field of Search ............... 428/624, 625, 626, 594,
428/593, 608; 296/211, 191; 52/792, 809, 309.9,
309.11; 264/46.5, 46.6, 46.7, 45.3

[56] References Cited

U.S. PATENT DOCUMENTS

| | | | |
|---|---|---|---|
| 1,784,511 | 12/1930 | Carns | 52/792 |
| 2,298,001 | 10/1942 | Fay | 52/792 |
| 2,391,997 | 1/1946 | Noble | 52/792 |
| 3,068,043 | 12/1962 | Komenda | 296/211 |
| 3,196,763 | 7/1965 | Rushton | 52/792 |
| 3,256,669 | 6/1966 | Seiwert | 52/792 |
| 3,815,307 | 6/1974 | Tantlinger | 296/211 |
| 3,859,401 | 1/1975 | Gallup et al. | 264/46.7 |
| 3,867,494 | 2/1975 | Rood et al. | 264/46.7 |
| 3,868,796 | 3/1975 | Bush | 52/309.9 |
| 3,960,999 | 1/1976 | Massie | 264/46.7 |
| 3,985,951 | 10/1976 | Harris | 264/46.7 |
| 4,083,902 | 4/1978 | Clyde | 264/46.7 |
| 4,107,833 | 8/1978 | Knight et al. | 264/46.7 |
| 4,130,614 | 12/1978 | Saidla | 264/46.7 |
| 4,357,013 | 11/1982 | Fernandez et al. | 264/46.7 |
| 4,369,608 | 1/1983 | Miura et al. | 52/309.9 |
| 4,413,822 | 11/1983 | Fernandez | 264/46.6 |
| 4,459,247 | 7/1984 | Rothemund | 264/45.3 |
| 4,459,249 | 7/1984 | Matsuda | 264/46.7 |

FOREIGN PATENT DOCUMENTS

| | | | |
|---|---|---|---|
| 180137 | 12/1953 | Austria | 52/792 |
| 91470 | 7/1980 | Japan | 296/211 |
| 151343 | 9/1982 | Japan | 264/46.7 |
| 198173 | 12/1982 | Japan | 296/211 |
| 763774 | 12/1956 | United Kingdom | 296/191 |
| 782481 | 9/1957 | United Kingdom | 264/46.7 |

Primary Examiner—L. Dewayne Rutledge
Assistant Examiner—John J. Zimmerman
Attorney, Agent, or Firm—Peter D. McDermott; Roger L. May

[57] ABSTRACT

A composite sandwich formed by enclosing a central resilient layer of a soft compressible material between two plate-shaped parts of foamable synthetic material and inserting the assembly into a cavity formed from two shells of prefabricated sheet metal. The resultant composite is subjected to a heat treatment for about 10 minutes at about 200° C. so that the foamable material expands to fill the cavity.

14 Claims, 10 Drawing Figures

COMPOSITE COMPONENTS OF SANDWICH CONSTRUCTION

The invention relates to a method of producing composite components of sandwich construction, in particular but not exclusively for motor cars, and to the composite components so produced.

A motor car is known from the German Auslegeschrift (Published Specification) 15 30 540, in which two shells of pre-fabricated metal sheets supported one upon the other and connected to one another are filled with a synthetic foam in order to achieve increased strength with a low weight of the component. The two shells are provided with intersecting ribs by means of which they are mutually supported.

This known composite component has the disadvantage that the filling with foam takes place using liquid components which react with each other in situ to form the foam, it being necessary under certain circumstances to use apparatus supporting the shape of the shells in order to prevent bulging of the components. The corrugations shown are not suitable for a sandwich component since when stressed they lead to separation between the covering plate and foam filling.

A method of producing a motor car body is known from the German Offenlegungsschrift (Laid-Open Specification) 28 45 708. In this method, a frame part of a body component formed from moulded sheet-metal parts in conventional manner must be constructed with a supporting flange on which a sandwich plate may then be supported and securely joined to the frame part. In this case the joining is effected by gluing and the free cut edges of the sandwich plate must then be covered by suitable covering strips.

This known method has the disadvantage that two semi-finished parts must first be formed which are subsequently joined together to form a finished bodywork component which may be secured or hinged on the bodywork.

According to the present invention, there is provided a method of producing composite components of sandwich construction, comprising the steps of assembling two shells, each in the form of a pre-fabricated metal sheet, and one or more plate-shaped parts of a foamable synthetic material reinforced with mineral fibres so that the shells define a cavity with the foamable material in the cavity, joining the two shells at their edges, and subjecting the resulting assembly to a heat treatment of a duration of approximately 10 minutes at a temperature of approximately 200° centigrade.

With this method, a composite component can be produced which may be formed without awkward handling of liquid materials which react by foaming and, immediately after its pre-fabrication, may be inserted into the composite structure of a motor car bodywork.

If the plate-shaped foamable parts have thicknesses varying locally in accordance with the cross-section of the cavity to be filled, complete filling with foam of the composite component may be ensured.

If two plate-shaped foamable parts are arranged in the cavity, with a resilient central layer of soft foam, jute, metal wool or the like between them, a more uniform filling with foam may be ensured during the heat treatment and a more secure bond of the synthetic foam to the shells may be ensured even in the case of large cavity cross-sections.

If the resilient central layer is porous or perforated with screen holes, a desired foam migration towards the inside may take place in order to reduce excessive foam pressures.

Since the foaming process is carried out at a high temperature, it is uncessary to clean the sheet metal parts of corrosion-preventing oil. It has been found that drawing grease may also be left on the plates in small quantities.

The invention is described in greater detail, by way of example, with reference to the accompanying drawings, in which.

Figure 1A:
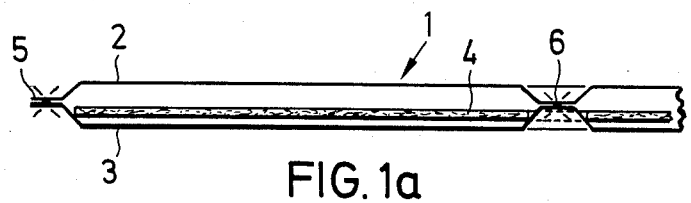
FIG. 1a is a diagrammatic cross-section through a pre-fabricated composite component.
Figure 1B:
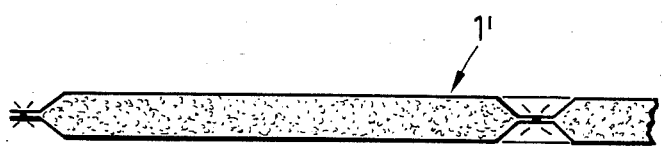
FIG. 1b is a diagrammatic cross-section through a finished composite component according to the invention.

A composite component 1 is shown in FIGS. 1a and 1b which comprises an upper shell 2 and a lower shell 3 of thin sheet metal capable of being deep-drawn, into the cavity of which a plate-shaped stamped or moulded part 4 of a foamable synthetic material, preferably a prereacted polyurethane foam which may be reinforced with mineral fibres, is loosely inserted, before the upper shell 2 and the lower shell 3 are joined by spot welding along their edges 5 and possible additional places 6. It can be seen from FIG. 1a that the plate-shaped stamped or moulded part 4 has suitable stamped out portions at an intended joining area.

After the composite component 1 pre-fabricated in this way has been subjected to a heat treatment at a temperature of approximately 200° centigrade for a duration of about 10 minutes, the finished composite component 1' is produced whose cavity is filled with a relatively uniform foamed material.

Figure 2A:
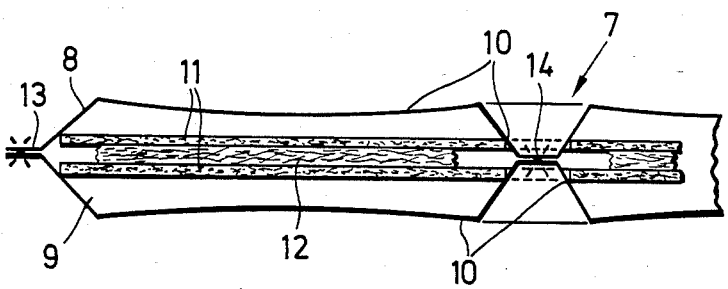
FIG. 2a is a diagrammatic cross-section through a further embodiment of a pre-fabricated composite component.
Figure 2B:
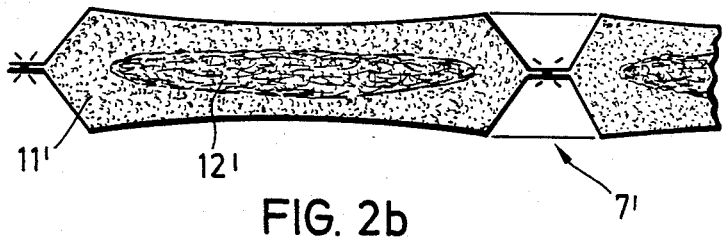
FIG. 2b is a diagrammatic cross-section through the finished composite component.

A further embodiment of a composite component 7 is shown in FIGS. 2a and 2b, in which an upper shell 8 and a lower shell 9 of thin sheet metal capable of being deepdrawn are provided with concave reinforcing impressed portions 10 of relatively large area and are likewise connected together by spot welding at their edges 13 and possible additional places 14 after the insertion of two plate-shaped stamped or moulded parts 11 of foamed synthetic material which have a resilient central layer 12 of soft foam, jute, metal wool or similar material between them.

The resilient intermediate layer 12 ensures that during the subsequent heat treatment the foamable synthetic material 11 is moved into a position bearing against the wall of the shells 8 and 9 which favours heat transmission, as a result of which a more uniform foam filling of large cavities may be ensured.

As the resilient central layer is made porous or perforated with holes like a sieve, a desired foam migration towards the inside may be provided which prevents excessive foam pressures and thus allows the composite components to be produced without additional moulding suport apparatus.

Figure 3A:
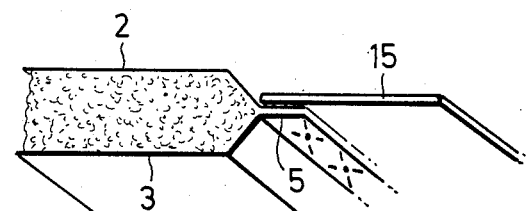
FIGS. 3a, 3b and 3c are diagrammatic sectional views through the joint areas of composite components with varying edge formations.
Figure 3B:
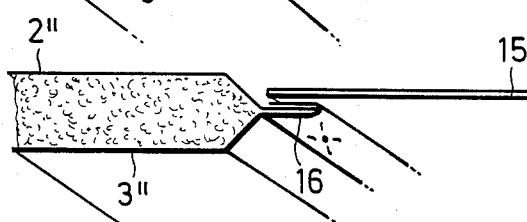
Figure 3C:
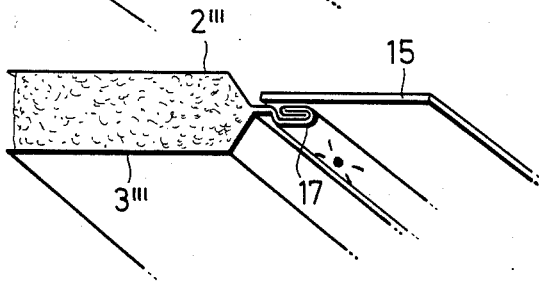

FIGS. 3a to 3c show the joining areas of various composite components which in each case comprise an upper shell 2 and a lower shell 3 which are simultaneously joined to one another and to a further part 15 of the bodywork along a single flanged edge 5.

In another embodiment an upper shell 2" is joined to a lower 3" in the form of a jointed-flange connection 16 and is again joined to part 15 of the bodywork by spot welding.

In a further embodiment an upper shell 2'" is joined to a lower shell 3'" by a double jointed-glange connection 17 and is again joined to part 15 of the bodywork by spot welding.

It is clear from these examples that even when thin metal sheets capable of being deep-drawn are used the appropriate arrangement of the edges of the two shell parts will always ensure a thickness of material which permits trouble-free spot-weld join with welding devices usual in bodywork construction.

Figure 4:
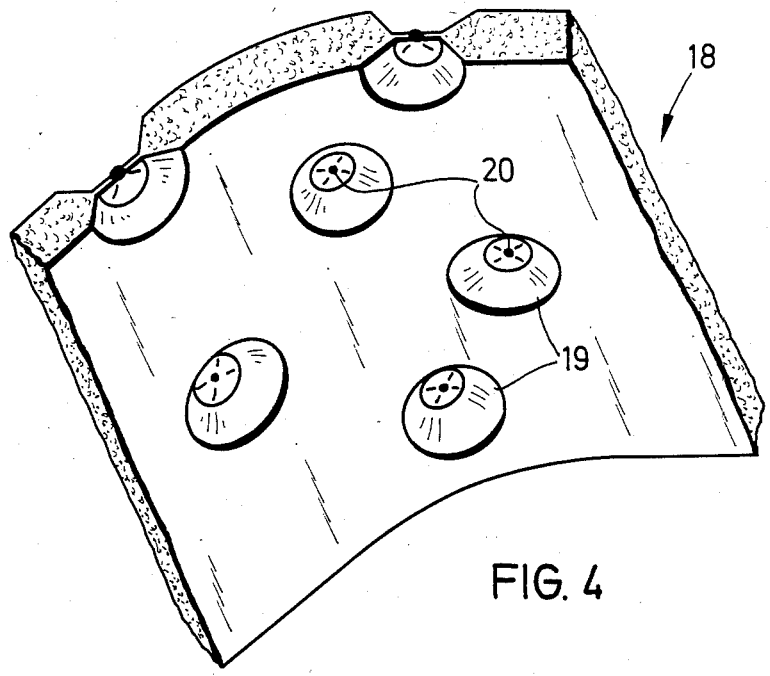
FIG. 4 is an oblique view of an arched composite component.

FIG. 4 is a view of an arched composite component 18 which is provided at regular or irregular intervals with impressed portions 19 which effect a connection between the two shell parts by a spot-weld point 20 in each case. The positions of the impressed portions 19 resist any tendency towards compression of the sandwich component.

Figure 5:
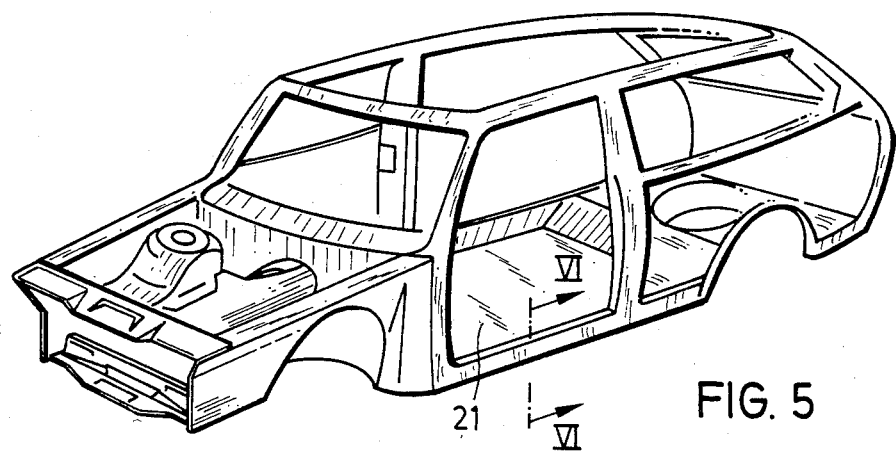
FIG. 5 is an oblique view of a motor car bodywork.
Figure 6:
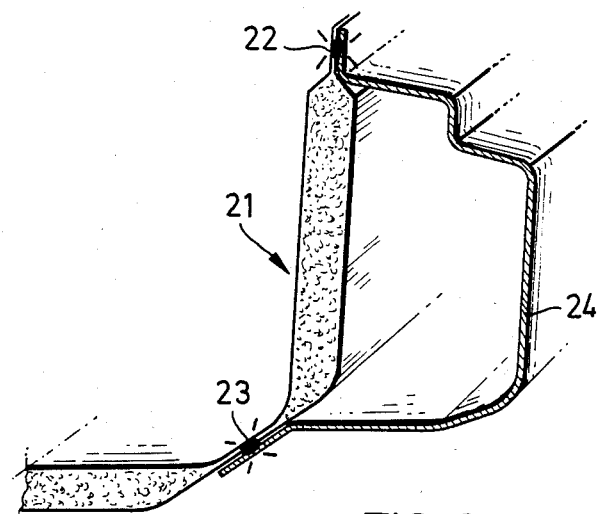
FIG. 6 is a section along the line VI—VI in FIG. 5 of a join between a base element composite component and a side wall/outer wall metal sheet.

A possible way of using the composite components described is shown in FIGS. 5 and 6. A base element composite component 21 comprises a flange area 22 capable of being spot-welded and further connection points 23 capable of having spot-welded, so that it may be connected to a side-wall outer metal sheet 24 so as to form a box girder.

Depending upon the choice of the selected thickness of metal sheet of the pre-formed shell parts, the composite component, pre-formed only, may be first welded into the structure of the bodywork of a motor car and foaming out may be performed during the customary cellulosing heat treatment, or however, where very thin metal sheets are used, a composite component of this type may be first subjected to a heat treatment so that it may then be handled more easily with the required stiffness without the danger of bulging and may be inserted in the part of the bodywork.

We claim:

1. A method of producing composite components of sandwich construction, comprising the steps of assembling two shells, each in the form of a prefabricated metal sheet to define a cavity, and two plate-shaped parts of foamable synthetic material with a resilient central layer of a soft compressible material between them in the cavity, joining the two shells at their edges, and subjecting the resulting assembly to a heat treatment of a duration of approximately 10 minutes at a temperature of approximately 200° centigrade.

2. A method as claimed in claim 1, wherein the foamable synthetic material is reinforced with mineral fibres.

3. A method as claimed in claim 1, wherein the two shells are also joined to each other at point other than their edges.

4. A method as claimed in claim 1, wherein the shells are joined by spot welding.

5. A method as claimed in claim 1, wherein said plate-shaped foamable part between said two shells of sheet metal has thickness varying locally in accordance with the cross-section of the cavity to be filled.

6. A method as claimed in claim 1, wherein said foamable part is formed by stamping.

7. A method as claimed in claim 1, wherein the foamable part is formed by moulding.

8. A method as claimed in claim 1, wherein the central layer is porous in order to make possible a foam migration towards the inside of said central layer.

9. A method as claimed in claim 1, wherein the central layer is perforated in order to make possible a foam migration towards the inside of said central layer.

10. A method as claimed in claim 1, wherein the edges of said two shells are provided with flanges by means of which the shells are joined.

11. A method as claimed in claim 1, wherein said plate-shaped part consists of pre-reacted polyurethane foam reinforced with mineral fibres.

12. A method as claimed in claim 1, wherein said shells have major faces which, when seen from outside the finished component, are concave.

13. A composite component of sandwich construction, produced according to the method of claim 1.

14. A composite component as claimed in claim 13, wherein said shells are curved and are joined to each other at points other than their edges, which points are placed so as to resist forces tending to compress the sandwich.

* * * * *